(12) United States Patent
Valero et al.

(10) Patent No.: US 9,334,718 B2
(45) Date of Patent: *May 10, 2016

(54) PROCESSING TIME SERIES DATA EMBEDDED IN HIGH NOISE

(75) Inventors: Henri-Pierre Valero, Yokohama (JP); Sandip Bose, Brookline, MA (US); Qiuhua Liu, Belmont, MA (US); Ramachandra Shenoy, Westborough, MA (US); Abderrhamane Ounadjela, Belmont, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 646 days.

This patent is subject to a terminal disclaimer.

(21) Appl. No.: 12/652,405

(22) Filed: Jan. 5, 2010

(65) Prior Publication Data
US 2010/0228530 A1    Sep. 9, 2010

Related U.S. Application Data

(60) Provisional application No. 61/142,534, filed on Jan. 5, 2009.

(51) Int. Cl.
*G01V 1/40* (2006.01)
*E21B 43/26* (2006.01)
*G01V 1/28* (2006.01)

(52) U.S. Cl.
CPC ............... *E21B 43/26* (2013.01); *G01V 1/288* (2013.01); *G01V 2210/123* (2013.01)

(58) Field of Classification Search
CPC .................................. G01V 1/288; E21B 43/26
USPC .......................................................... 702/11
See application file for complete search history.

(56) References Cited

U.S. PATENT DOCUMENTS

| 5,050,067 A | 9/1991 | McLagan et al. |
| 5,508,973 A | 4/1996 | Mallick et al. |
| 6,597,632 B2 | 7/2003 | Khan |

(Continued)

OTHER PUBLICATIONS

Barree, "Applications of pre-frac injection/falloff tests in fissured reservoirs—field examples", SPE 39932, 1998 SPE Rocky Mountain Regional/Low Permeability Reservoirs Symposium and Exhibit held in Denver, Colorado, Apr. 5-8, 1998, pp. 277-288.

(Continued)

*Primary Examiner* — Sujoy Kundu
*Assistant Examiner* — Ricky Ngon
(74) *Attorney, Agent, or Firm* — Jakub Michna

(57) ABSTRACT

Automatic detection and accurate time picking of weak events embedded in strong noise such as microseismicity induced by hydraulic fracturing is accomplished by: a noise reduction step to separate out the noise and estimate its spectrum; an events detection and confidence indicator step, in which a new statistical test is applied to detect which time windows contain coherent arrivals across components and sensors in the multicomponent array and to indicate the confidence in this detection; and a time-picking step to accurately estimate the time of onset of the arrivals detected above and measure the time delay across the array using a hybrid beamforming method incorporating the use of higher order statistics. In the context of hydraulic fracturing, this could enhance the coverage and mapping of the fractures while also enabling monitoring from the treatment well itself where there is usually much higher and spatially correlated noise.

36 Claims, 4 Drawing Sheets

(56) References Cited

U.S. PATENT DOCUMENTS

| | | | |
|---|---|---|---|
| 6,678,617 | B2 | 1/2004 | Khan |
| 7,272,505 | B2 | 9/2007 | Bagaini |
| 7,391,675 | B2* | 6/2008 | Drew .......................... 367/73 |
| 7,660,194 | B2 | 2/2010 | Uhl et al. |
| 2004/0135698 | A1* | 7/2004 | Webb et al. .................. 340/690 |
| 2008/0033655 | A1* | 2/2008 | Ozbek et al. .................. 702/17 |
| 2009/0149981 | A1* | 6/2009 | Evans et al. .................. 700/110 |
| 2009/0194273 | A1* | 8/2009 | Surjaatmadja et al. .... 166/250.1 |

OTHER PUBLICATIONS

Cipolla et al, "State-of-the-art in hydraulic fracture diagnostics", SPE 64434, SPE Asia Pacific Oil and Gas Conference and Exhibition held in Brisbane, Australia, Oct. 16-18, 2000, 15 pages.

Douze et al, "Short note—Statistics of semblance", Geophysics, vol. 44, No. 12, Dec. 1979, pp. 1999-2003.

Hahn et al, "Optimum processing for delay-vector estimation in passive signal arrays", IEEE Transactions on Information Theory, vol. IT-19, No. 5, Sep. 1973, pp. 608-614.

Hahn, "Optimum signal processing for passive sonar range and bearing estimation", J. Acoust. Soc. Am., vol. 58, No. 1, Jul. 1975, pp. 201-207.

Haykin et al, "Some aspects of array signal processing", IEEE Processing of Radar and Signal Processing, 139(1): 1-26, 1992.

Hinich et al, "Parameter estimation for an r-dimensional plane wave observed with additive independent gaussian errors", The Annals of Mathematical Statistics, 1972, vol. 43, No. 1, pp. 153-169.

Hoctor et al, "The unifying role of the coarray in aperture synthesis for coherent and incoherent imaging", Proceedings of the IEEE, vol. 78, No. 4, Apr. 1990, pp. 735-752.

Johnson et al, "The application of hydraulic fracturing models in conjunction with tracer surveys to characterize and optimize fracture treatments in the brushy canyon formation, Southern New Mexico", SPE 36470, 1996 SPE Annual Technical Conferences and Exhibition held in Denver, Colorado, USA, Oct. 6-9, 1996, pp. 543-558.

Kelly et al, "Signal parameter estimation for seismometer arrays", Massachusetts Institute of Technology, Lincoln Laboratory, Technical Report 339, Jan. 8, 1964, 36 pages.

Lees et al, "Multiple-taper spectral analysis: A stand-alone c-subroutine", Computers & Geosciences, vol. 21, No. 2, pp. 199-236, 1995.

Morris J. Levin, Ph.D., "Least-squares array processing for signals of unknown form", The Radio and Electronic Engineer, Apr. 1965, pp. 213-222.

Rutledge et al, "Hydraulic stimulation of natural fractures as revealed by induced microearthquakes, Carthage Cotton Valley gas field, east Texas", Geophysics, vol. 68, No. 2, Mar.-Apr. 2003, pp. 441-452.

D. Slepian, "Prolate spheroidal wave functions, fourier analysis, and uncertainty—v: The discrete case", Bell System Technical Journal, May-Jun. 1978, vol. 57, No. 5, pp. 1371-1430.

David Thomson, "Spectrum estimation and harmonic analysis", Proceedings of the IEEE, vol. 70, No. 9, Sep. 1982, pp. 1055-1096.

Valero et al, "High resolution compressional slowness log estimation using first motion detection", SEG Extended Abstract, 75th Annual Meeting, Houston, Nov. 6-11, 2005, pp. 356-360.

Warpinski et al, "Analysis and prediction of microseismicity induced by hydraulic fracturing", SPE Journal, Mar. 2004, pp. 24-33.

Warpinski et al, "Mapping hydraulic fracture growth and geometry using microseismic events detected by a wireline retrievable accelerometer array", SPE 40014, 1996 SPE Gas Technology Symposium held in Calgary, Alberta, Canada, Mar. 15-18, 1996, pp. 335-346.

Wright et al, "Downhole tiltmeter fracture mapping: a new tool for directly measuring hydraulic fracture dimensions", SPE 49192, 1998 SPE Annual Technical Conference and Exhibition held in New Orleans, Louisiana, Sep. 27-30, 1998, pp. 585-597.

Wright et al, "Surface tiltmeter fracture mapping reaches new depths—10,000 feet, and beyond?", SPE 39919, 1998 SPE Rocky Mountain Regional/Low Permeability Reservoirs Symposium and Exhibition held in Denver, Colorado, Apr. 5-6, 1998, pp. 135-146.

Warpinkski et al, Analysis and Prediction of Microseismicity Induced by Hydraulic Fracturing SPE 87673, Mar. 2004, pp. 24-33.

Henry Scheffe, "The Analysis of Variance", University of California, Berkely, A Wiley Publication in Mathematical Statistics, 1959, ISBN 0471758345, 10 pages.

* cited by examiner

PROCESSING TIME SERIES DATA EMBEDDED IN HIGH NOISE

CROSS-REFERENCE TO RELATED APPLICATIONS

This application claims the benefit of U.S. Provisional Application No. 61/142,534, entitled "An Integrated Processing Workflow for Processing Time Series Data Embedded in High Noise: Application to HFM Data," filed Jan. 5, 2009.

BACKGROUND OF THE INVENTION

The present invention is generally related to seismic data processing, and more particularly to seismic data processing of data from a plurality of sensors for purposes such as monitoring hydraulic fracturing treatments. Seismic data processing has long been associated with the exploration and development of subterranean resources such as hydrocarbon reservoirs. While numerous technological advances have been made in the art, at least some potentially useful seismic data is not fully utilized because of unfavorable signal to noise ratios.

One example of a procedure that could be enhanced by improved seismic data processing is Hydraulic fracture monitoring (HFM). Hydraulic fracturing is a stimulation treatment via which reservoir permeability is improved by subjecting a formation adjacent to a portion of a borehole to increased pressure in order to create and widen fractures in the formation, thereby improving oil and gas recovery. HFM techniques are utilized to evaluate the propagation paths and thickness of the fractures. Some HFM techniques that are known in the art are described in: R. D. Barree, "Application of pre-frac injection/falloff tests in fissured reservoirs field examples," SPE paper 39932, presented at the 1998 SPE Rocky Mountain Regional Conference, Denver, Apr. 5-8, 1998; C. L. Cipolla and C. A. Wright, "State-of-the-art in hydraulic fracture diagnostics," SPE paper 64434, presented at the SPE Asia Pacific Oil and Gas Conference and Exhibition held in Brisbane, Australia, October 1618, 2000; C. A. Wright et. al, "Downhole tiltmeter fracture mapping: A new tool for directly measuring hydraulic fracture dimensions," SPE paper 49193, Presented at 1998 SPE Annual Technical Conference, New Orleans, 1998; C. A. Wright et. al, "Surface tiltmeter fracture mapping reaches new depths 10,000 feet, and beyond," SPE paper 39919, presented at the 1998 SPE Rocky Mountain Regional Conference, Denver, Apr. 5-8, 1998; N. R. Warpinski et. al, "Mapping hydraulic fracture growth and geometry using microseismic events detected by a wireline retrievable accelerometer array," SPE 40014 presented at the 1998 SPE Gas Technology Symposium in Calgary, Canada, Mar. 15-16, 1998; R. L. Johnson Jr. and R. A. Woodroof Jr., "The application of hydraulic fracturing models in conjunction with tracer surveys to characterize and optimize fracture treatments in the brushy canyon formation, southeastern new mexico," SPE paper 36470, presented at the 1996 Annual Technical Conference and Exhibition, Denver, Oct. 6-9, 1996; J. T. Rutledge and W. S. Phillips, "Hydraulic stimulation of natural fractures as revealed by induced microearthquakes, carthage cotton valley gas field, east texas," *Geophysics*, 68:441-452, 2003; and N. R. Warpinski, S. L. Wolhart, and C. A. Wright, "Analysis and prediction of microseismicity induced by hydraulic fracturing," SPE Journal, pages 24-33, March 2004. The last two references listed above describe "microseismic" techniques. Microseismic events occur during hydraulic fracture treatment when pre-existing planes of weakness in the reservoir and surrounding layers undergo shear slippage due to changes in stress and pore pressure. The resulting microseismic waves can be recorded by arrays of multicomponent geophones placed in the well undergoing treatment or a nearby monitoring well. However, the recorded microseismic waveforms are usually complex wavetrains containing high amplitude noise as well as borehole waves excited by operation of pumps located at the surface. Consequently, accurately estimating the time of arrival of various recorded events such as p- and s-wave arrivals is technologically challenging.

SUMMARY OF THE INVENTION

A method in accordance with the invention comprises the steps of: using a plurality of sensors to acquire time series data corrupted by noise and including signals caused by microseismic events in a subterranean formation; processing discrete portions of the data to determine, for each portion, whether an event of interest is present; for each portion containing an event of interest, determining a first arrival time of the event and delay across the plurality of sensors; and using the first arrival time and delay to spatially map fractures in a subterranean formation.

A computer program product in accordance with the invention comprises a computer usable medium having a computer readable program code embodied therein, said computer readable program code adapted to be executed to implement a method for event classification, said method comprising: using a plurality of sensors to acquire time series data corrupted by noise and including signals caused by microseismic events in a subterranean formation; processing discrete portions of the data to determine, for each portion, whether an event of interest is present; for each portion containing an event of interest, determining a first arrival time of the event and delay across the plurality of sensors; and using the first arrival time and delay to spatially map fractures in a subterranean formation.

Apparatus in accordance with the invention comprises: an array of receivers that acquire time series data corrupted by noise and including signals caused by microseismic events in a subterranean formation; processing circuitry for processing discrete portions of the data to determine, for each portion, whether an event of interest is present; and for each portion containing an event of interest, determining a first arrival time of the event and delay across the plurality of sensors; and an interface which outputs information associated with spatially mapping fractures in a subterranean formation based on the first arrival time and delay.

DETAILED DESCRIPTION

Figure 1:
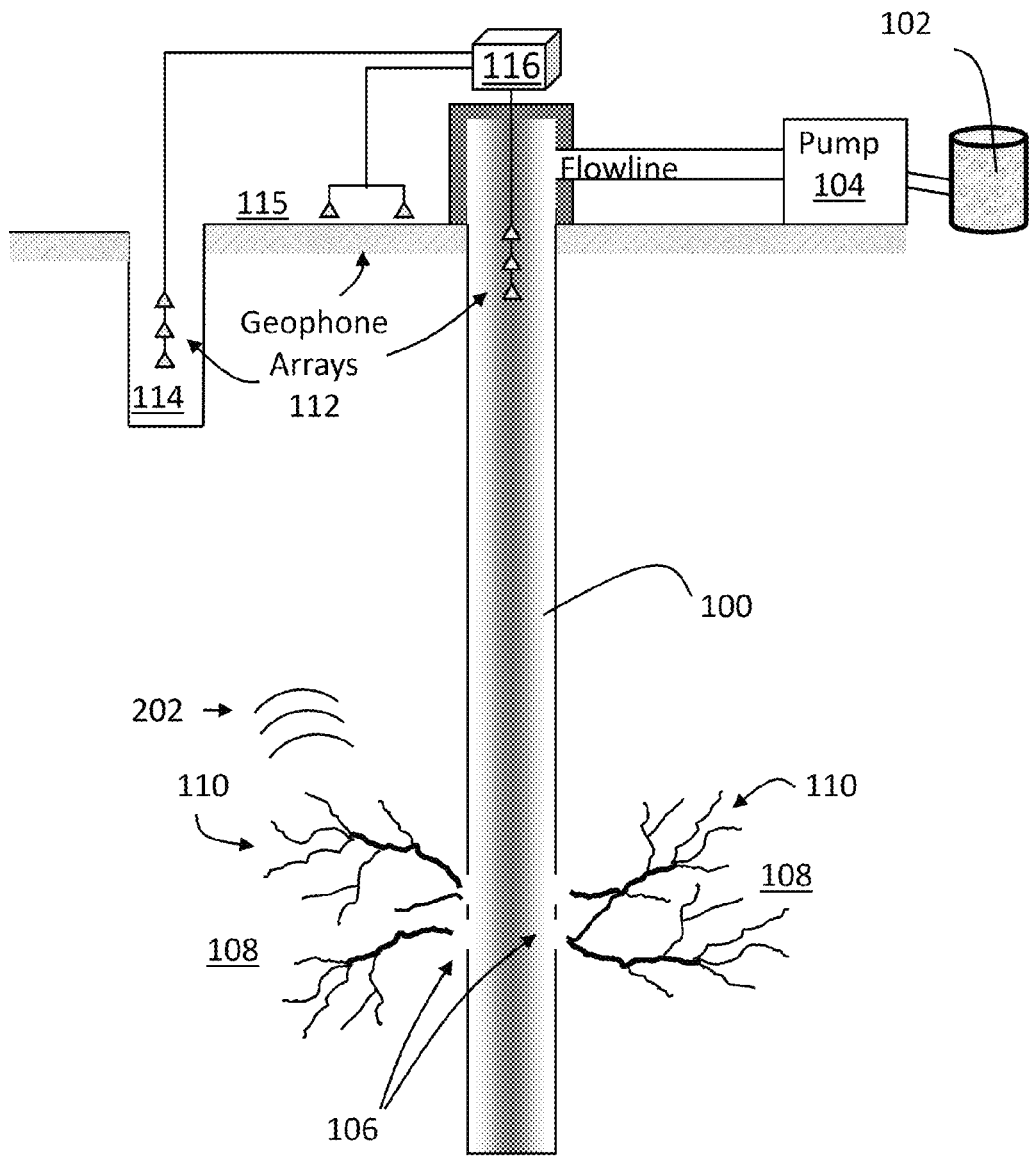
FIG. 1 illustrates apparatus for performing and monitoring hydraulic fracturing using microseismic data.

Referring to FIG. 1, in order to implement a hydraulic fracturing treatment of a borehole ("treatment borehole") (100), treatment fluid (102) is pumped into the borehole from a surface reservoir using a pump (104). The treatment fluid may be hydraulically confined to a particular portion of the borehole by using packers. For example, if the borehole includes a completion then some or all perforations (106) in a particular area may be hydraulically isolated from other portions of the borehole so that the fracturing treatment is performed on a particular portion of the formation (108). In order to implement the treatment, the pressure of the treatment fluid is increased using the pump. The communication of that increased pressure to the formation tends to create new fractures and widen existing fractures (collectively, fractures (110)) in the formation.

Figure 2:
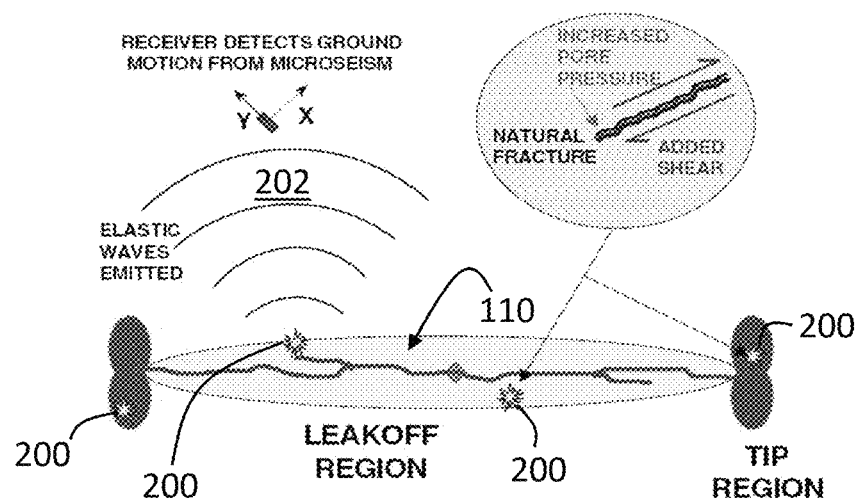
FIG. 2 illustrates microseismic wave generation associated with hydraulic fracturing in greater detail.

Referring to FIGS. 1 and 2, the hydraulic fracturing treatment described above causes microseismic events (200) to occur. As a result, microseismic waves (202) are emitted when pre-existing planes of weakness in the reservoir and surrounding layers undergo shear slippage due to changes in stress and pore pressure. The emitted microseismic waves (202) are recorded by arrays of multicomponent geophones (112) placed within the treatment borehole (100), a monitoring borehole (114), or at the surface (115). The microseismic waves detected by the geophones are processed by a hydrophone digitizer, recorder and analyzer device (116) in order to monitor the hydraulic fracturing treatment. For example, the creation, migration and change in fractures may be monitored in terms of both location and volume. The information obtained by monitoring may be used to help control aspects of the fracturing treatment such as pressure changes and fluid composition, and also to determine when to cease the treatment. Further, use of the information to control the treatment may be automated.

Figure 3:
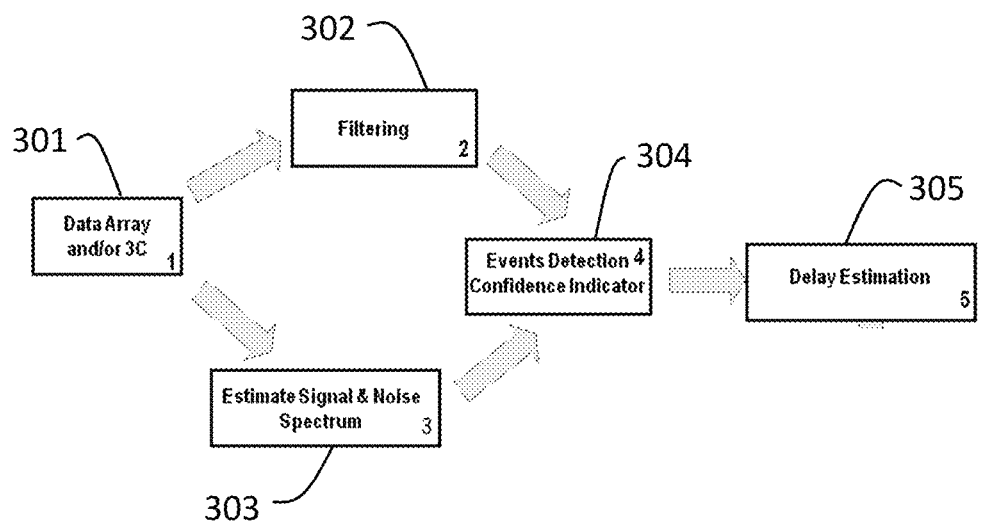
FIG. 3 is a block diagram of a method for processing time series data embedded in high noise.

A method for processing time series data embedded in noise is illustrated in FIG. 3. The noise may originate from any of various sources including but not limited to pumps and background events. Some or all of these steps may be performed by the hydrophone digitizer, recorder and analyzer device (116, FIG. 1). Those skilled in the art will appreciate that processing circuitry, computer programs stored on a computer readable medium, I/O interfaces and other resources may be used to implement the steps. Input data recorded by a borehole seismic tool or geophone array is obtained in step (301). Step (302) is to filter the recorded data to remove as much noise as practical from the recorded data to facilitate first motion detection. The result of step (302) is filtered data together with residual noise. The noise removal step can be automated or, alternatively, omitted. In other words, flow may proceed to step (304) either from step (302) or step (303) because filtering may be omitted at the instruction of the operator. When the filtering step (302) is omitted, the operator may manually estimate the noise signal and the signature of the signal of interest, i.e. the HFM event, in step (303). Alternatively, step (303) can be automated by using previous sections of the data where no strong signal was detected. Step (304) is event detection. Event detection provides statistical information indicative of the presence or absence of HFM events in the recorded data. In one embodiment a sliding window is used to scan portions of the recorded data along the time axis. For each time location of the window, a hypothesis test is performed to detect whether an HFM event is present in the window. The output of step (304) is indicative of the window locations containing candidate HFM events. The output may also include an indication of a level of confidence in the presence of an HFM event for each window location. Step (305) step is delay estimation. For each window location containing a candidate HFM event as indicated by the output of step (304) a time delay estimation algorithm is used to determine the first arrival time of the event. The determined arrival time and delays will be used later to spatially map fractures in the reservoir.

Figure 4:
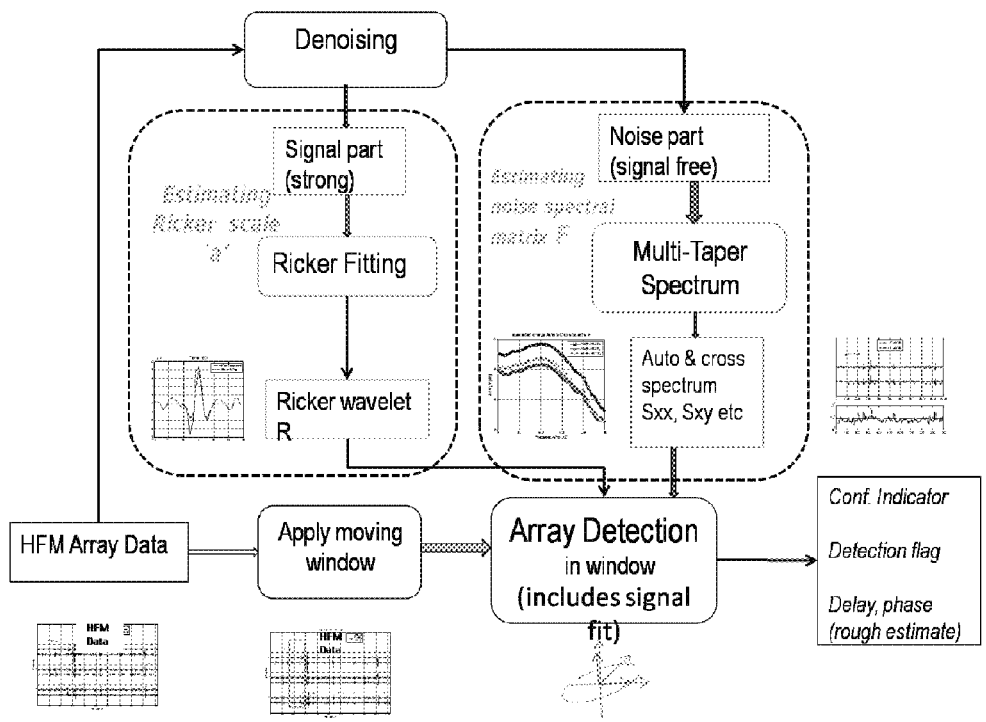
FIG. 4 illustrates the event detection and confidence indicator generation step in greater detail.

FIG. 4 illustrates the event detection and confidence indicator generating step (304, FIG. 3) in greater detail. The two main components of the technique are estimation of the transfer function and estimation of the noise power spectrum. The step is distinct from the well known technique of detecting the presence of an event based on an energy ratio function. According to that well known technique, the ratio between the instantaneous trace energy normalized by the cumulative trace energy is computed as follows:

$$Ef(t) = \frac{\int_{\tau}^{\tau+T} x^2(t) dt}{\int_{0}^{T} x^2(t) dt} \tag{1}$$

where T is the width of the running window used to compute the instantaneous energy. The absence or presence of an event is then detected based on a threshold applied to the energy ratio function. A limitation of the ratio-based technique is that it does not function well when the signal to noise ratio (SNR) is unfavorable, i.e., when the signal amplitude is not significantly greater than the noise amplitude. Further, the ratio-based technique does not yield an indication of confidence that the detected event is a signal of interest rather than noise.

In the illustrated embodiment a statistical procedure is utilized for event localization using both the signal and noise information from the array data. The recorded data is scanned using a time-sliding window. At the various window locations a determination is made whether the location contains a signal of interest. This can be viewed as a windowed time series $x_{ml}(t)$, m=1, . . . , Nr; l=x, y, z; t=1, . . . , N, where Nr, L, and N are respectively, the number of receivers in the array, the component type and the length of the window. The time series can be modeled as:

$$x_{ml}(t) = s_{ml}(t) + \epsilon_{ml}(t) \tag{2}$$

Vectors X(t), S(t), and $\epsilon$(t) are built using some or all of the components above. Letting $X_N = [X(1), \ldots, X(N)]$, assume that the noise process is stationary Gaussian with power spectrum density $F(\lambda)$, i.e. $\epsilon(\lambda) \sim \mathcal{N}(0, F(\lambda))$, where $\lambda$ is the frequency. The signal S(t) is modeled as a deterministic but unknown quantity belonging to a signal class given by a scaled and delayed version of a common trace $s_o(t)$, which, in turn, is obtained by convolving a Ricker wavelet with an FIR filter, $$s_0(t) = s_R(t) * h(t) \tag{3}$$

where * denotes convolution, $s_R(t)$ is the Ricker wavelet and $$h(t) = \begin{cases} h_t, & t \in [0, P-1] \\ 0, & \text{otherwise} \end{cases} \tag{4}$$

is a P-order FIR filter. The signal is then given by $$S(t) = \mu G(t) * s_0(t) \tag{5}$$

where $$\tilde{G}_{ml}(\lambda) = \exp(-i\delta_{n2}\lambda)\exp(-j\phi_e) : \phi_e = \{0, \pi\} \tag{6}$$

is the transfer function (in the frequency domain) of the media. This model, incorporating delays and $(0, \pi)$ phase shifts, yields a good empirical fit to real HFM signals.

The event detection problem can be considered as testing between the following two hypotheses:

$$H_0: \mu = 0$$

$$H_1: \mu \neq 0 \qquad (7)$$

Assuming that $F(\lambda)$ is known or has been estimated, the log likelihood function under $H_0$ can be calculated. For the Fourier Domain data, $\tilde{X}_j = \tilde{X}(\lambda_j)$ with $\tilde{X}(\lambda) = \mathcal{F}T(X(t))$ and $\lambda_j = 2\pi j/N$ are the Fourier frequencies.

$$\tilde{X}_N = [\tilde{X}_1, \ldots, \tilde{X}_{N_f}], N_f = \lfloor (N-1)/2 \rfloor. \qquad (8)$$

Then $$LL(H_0 \mid \overline{X}_N) = K - \sum_{j=1}^{N_f} \overline{X}_j^\dagger F_j^{-1} \overline{X}_j \qquad (9)$$

where j indexes the Fourier coefficients of the corresponding quantities. Under $H_1$, the signal model in frequency domain is given by:

$$\tilde{S}(\lambda) = \mu \tilde{G}(\lambda) \tilde{s}_R(\lambda) H(\lambda) \qquad (10)$$

where $$H(\lambda) = \sum_{p=0}^{P-1} h_p \exp(-i2\pi\lambda p) = \Omega_\lambda \underline{h}, \qquad (11)$$

with $\Omega(\lambda) = [1, \exp(-i2\pi\lambda), \ldots, \exp(-2\pi\lambda(P-1)]$ and $\underline{h} = [h_0, \ldots h_{p-1}]^T$. Then $$\tilde{S}(\lambda) = \mu \tilde{G}(\lambda) \tilde{s}_R(\lambda) \Omega(\lambda) \underline{h} \qquad (12)$$

where $\mu$ and $\underline{h}$ are unknown and have to be determined. Accordingly, $\mu$ is absorbed into $\underline{h}$, the frequency domain quantities above are represented at the Fourier frequencies $\lambda_j$ by appending the subscript j; e.g. $\tilde{S}_j = \tilde{S}(\lambda_j)$ etc., and the likelihood under $H_1$ is as follows:

$$LL(H_1, h \mid \overline{X}_N) = K - \sum_{j=1}^{N_f} \{(\overline{X}_j - \overline{S}_j))^\dagger F_j^{-1} (\overline{X}_j - \overline{S}_j) \qquad (13)$$

$$= K - \sum_{j=1}^{N_j} (\overline{X}_j - G_j S_{R,j} \Omega_j \underline{h})^\dagger$$

$$F_j^{-1} (\overline{X}_j - G_j S_{R,j} \Omega_j \underline{h})$$

$$= K - \sum_{j=1}^{N_f} \{(\overline{X}_j - H_j \underline{h})^\dagger F_j^{-1} (\overline{X}_j - H_j \underline{h})$$

where $G_j S_{R,j} \Omega_j = H_j$. The optimum $\underline{\hat{h}}$ obtained, for example, by setting $$\frac{\partial}{\partial h} LL = 0,$$

from which $$\hat{\underline{h}} = \left( \sum_{j=1}^{N_f} H_j^\dagger F_j^{-1} H_j \right)^{-1} \left( \sum_{j=1}^{N_f} H_j^\dagger F_j^{-1} \overline{X}_j \right) \qquad (14)$$

Substituting back into Eq. (13) and simplifying, the test statistic for the hypothesis testing problem is:

$$\tau(X_N) = LL_{H_1} - LL_{H_0} \qquad (15)$$

$$= \left( \sum_{j=1}^{N_f} H_j^\dagger F_j^{-1} \overline{X}_j \right)^\dagger \left( \sum_{j=1}^{N_f} H_j^\dagger F_j^{-1} H_j \right)^{-1} \left( \sum_{j=1}^{N_f} H_j^\dagger F_j^{-1} \overline{X}_j \right)$$

$$= \Delta^\dagger \Gamma^{-1} \Delta$$

where the vector $\Delta = \sum_{j=1}^{N_f} H_j^\dagger F_j^{-1} \tilde{X}_j$ and the matrix $\Gamma = \sum_{j=1}^{N_f} H_j^\dagger F_j^{-1} H_j$. Letting $W_j = F_j^{-1} G_j$ and $v_j = G_j^\dagger F_j^{-1} G_j$, it follows that:

$$\Gamma_{mn} = \sum_{j=1}^{N_f} |S_{R,j}|^2 v_j \exp(i2\pi\lambda_j (m-n)), m, n = 1, \ldots, P \qquad (16)$$

$$\Delta_k = \sum_{j=1}^{N_f} S_{R,j}^* W_j^\dagger \overline{X}_j \exp(i2\pi\lambda_j k), k = 1, \ldots, P.$$

An event will be considered present in the window if $$\tau(X_N) > \tau_o. \qquad (17)$$

The threshold is chosen based on the statistical behavior of the $\tau$ under $H_o$; with Gaussian noise, it is possible to set this independently of the actual noise covariance and obtain a constant false alarm rate (CFAR) detector for testing at a given level of significance. Additionally the value of the test statistic gives a measure of the confidence level in the presence of an event in a given window, which is useful for downstream processing.

It will be appreciated that the transfer function $G(\lambda)$ cf Eq. (6) is assumed to be known in the event detection algorithm described above. However, in practice that will not always be a safe assumption. Because performance of the detector is not particularly sensitive to the precise value of the delay used, it is feasible to iterate over a coarse grid of delays as well as phase shifts and choose the highest value of the test statistic function for the purpose of detection. However, this increases the computational load. An alternative approach is to consider the three components at only one receiver of interest. Because it is reasonable to consider that a signal recorded by a 3C geophone will arrive at the same time on all the components, the transfer function presented previously can still be used by setting the time delays to zeros.

It will be appreciated that noise power spectrum density $F(\lambda)$ is assumed to be known for the automatic window selection described above. However, in practice that will not always be a safe assumption. The power spectrum can be estimated via the multiple-taper method described in J. M. Lees and J. Park, "Multiple-taper spectral analysis: A stand-alone c-subroutine," *Computers & Geosciences,* 21:199-236, 1995; and D. J. Thomson, "Spectrum estimation and harmonic analysis," Proceedings of the IEEE, 70:1055-1096, 1982. Multi-taper spectral analysis provides a good spectrum estimate for narrow band or single frequency analysis. It minimizes the spectral leakage by applying window weighting functions or tapers to the time series data before the Fourier transform, and uses a special set of orthonormal tapers which are combined to get an average estimate of the spectrum so as to reduce the variance of the overall spectrum estimate. This special set of tapers, called the discrete prolate spheroidal sequences (see D. Slepian, "Prolate spheroidal wave functions, fourier analysis, and uncertainty—v: The discrete case," *Bell System Technical Journal*, 57:1371-430, 1978) are useful for managing the trade-off of bias (leakage) versus variance.

The multitaper spectral analysis includes three steps. First, a set of K Slepian prolate sequences are computed by solving an eigenvector problem for a Toeplitz system (see Id.). These K Slepian tapers, w(1), ..., w(K), are then applied to the data x, and the fast Fourier Transform (FFT) is applied to each tapered copy of the data resulting in K eigenspectra:

$$Y_k(\lambda_j) = \frac{1}{\sqrt{N}} \sum_{n=1}^{N} \omega_n^{(k)} x_n \exp(i\lambda_j n), k = 1, \ldots K. \quad (18)$$

Finally, the eigenspectra are combined to get the final spectrum estimation, e.g., using:

$$F(\lambda_j) = \sum_{k=1}^{K} \frac{1}{\alpha_k} |Y_k(\lambda_j)|^2 \quad (19)$$

where $\alpha_k$ is the bandwidth retention factor which specifies the proportion of narrow-band spectral energy captured by the kth Slepian taper for a white-noise process. Note that $\alpha_k \approx 1$ for tapers that possess good resistance to spectral leakage. Adaptive methods to further optimize the leakage could also be used, but the above approach is adequate in practice. The noise power spectrum is assumed to vary slowly and therefore does not have to be computed on every window. Rather, segments of signal free data, obtained for example from windows on which the detector has already been applied and yielded no event, can be used to compute this estimate and applied to a number of windows in the vicinity. Alternatively the noise output of a denoising step can be used for this computation.

Referring again to FIG. 3, the delay estimation step (305) will be described in greater detail. Assuming the sliding observation window described above for event localization contains the signals of interest, the next step is to estimate the relative time delays across an array of receivers. In the illustrated embodiment the data is collected with multi-component geophones, thereby allowing data analysis to be based on independent components or all components simultaneously. Two signals $x_1(t)$ and $x_2(t)$ recorded at two receiver positions can be mathematically represented by the following equation:

$$x_1(t)=s(t)*f(t)+n_1(t)$$

$$x_2(t)=s(t-\tau_0)*h(t)+n_2(t) \quad (20)$$

where, s(t) is the signal sent into the formation, f(t) and g(t) correspond to the impulse response of the medium, and $n_2(t)$ and $n_1(t)$ correspond to the noise recorded by each receiver. Usually the noise is not considered to be correlated with the input signal sent to the medium. However, the noise recorded by two receivers can be correlated. In the case of sonic and seismic data, the problem can be simplified by assuming that the medium properties are the same and the noise data have the same statistical properties across the array. Under the previous assumptions, the general equations can be simplified to $$x_1(t)=s(t)*g(t)+n_1(t)$$

$$x_2(t)=s(t-\tau_0)*g(t)+n_2(t) \quad (21)$$

One of the most commonly used methods for estimating delay between two or more receivers is cross-correlation, i.e.:

$$r_{x_1 x_2}(\tau) = E[x_1(t)x_2(t+\tau)] = \mathcal{F}^{-1}[P_{x_1 x_2}(w)] \quad (22)$$

where E is the expectation function, $F^{-1}$ is the inverse Fourier transform and $P_{x1x2}$(w) is the cross-spectrum, defined as:

$$P_{x_1 x_2}(w) = E[X_1^*(w)X_2(w)] \quad (23)$$

The argument maximizing the cross-correlation $r_{x1x2}(\tau)$ is taken as the estimate of the time delay $\tau_0$ between signals $x_1(t)$ and $x_2(t)$. With the signal model described in Equation (20), the cross spectrum can be partitioned into three components $$P_{x_1 x_2}(\omega) = E[X_1^*(\omega)X_2(\omega)] \quad (24)$$

$$= \underbrace{F^*(\omega)H(\omega)}_{media} \underbrace{P_{ss}(\omega)}_{source} \underbrace{e^{-j\omega\tau_0}}_{delay} + \underbrace{P_{n_1 n_2}(\omega)}_{noise}$$

Note that this delay estimation is colored by the propagation media, the source signature and the correlated noises. To suppress the effects of the transmission media and the source signal, the cross-spectrum is normalized by the individual autospectra, resulting in the complex coherence function:

$$\gamma_{x_1 x_2}(\omega) = \frac{P_{x_1 x_2}(\omega)}{\sqrt{P_{x_1 x_1}(\omega) P_{x_2 x_2}(\omega)}} \quad (25)$$

$$= \underbrace{\frac{H(\omega)/F(\omega)}{|H(\omega)/F(\omega)|}}_{media} \underbrace{\frac{U(\omega)}{SNR}}_{SNR} \underbrace{e^{-j\omega\tau_0}}_{delay} + \underbrace{\frac{P_{n_1 n_2}(\omega)}{\sqrt{P_{x_1 x_1}(\omega) P_{x_2 x_2}(\omega)}}}_{noise}$$

where U(w) is a combined measure of signal-to-noise ratios $U_{x1}$(w) and $U_{x2}$(w), $$U(\omega) = \frac{1}{\sqrt{\left(1 + \frac{1}{U_{x_1}(\omega)}\right)\left(1 + \frac{1}{U_{x_2}(\omega)}\right)}} \quad (26)$$

The coherence-correlation function is obtained by taking the inverse Fourier transform of $\gamma_{x1x2}$(w).

Detection techniques based on coherence provide advantages regarding the cross-correlation. The amplitudes of the propagation are normalized, and the coherence function depends on the signal-to-noise ratio rather than on the signal spectrum itself. In the limit when the noise is negligible, U(w) will become unity that does not depend on the spectral content of the source. Nevertheless, the noise correlation term still exists in the coherence function, although normalized. One of the limitations of the second-order technique is that it is not able to properly manage the correlated noise across the array.

In an alternative embodiment the detection step is based on third order statistics, namely bispectral-correlation. The bispectrum between two signals $x_1(t)$ and $x_2(t)$ is defined as $$B_{x_1 x_2 x_1}(w_1, w_2) = E[X_2(w1)X_1(w2)X_1^*(w1+w2)] \quad (27)$$

The bispectrum ratio is defined as $$\beta_{x_1 x_2 x_1}(\omega_1, \omega_2) = \frac{B_{x_1 x_2 x_1}(\omega_1, \omega_2)}{B_{x_1 x_1 x_1}(\omega_1, \omega_2)} \quad (28)$$

$$= \underbrace{H(\omega_1)/F(\omega_1)}_{media} \underbrace{e^{-j\omega_1 \tau_0}}_{delay}$$

which eliminates the correlation of the Gaussian noise, although the ratio still keeps the medium transfer function. The bispectral-correlation is obtained by summing up $\beta_{x1x2x1}(w_1, w_2)$ along $w_2$ and then taking the 1-D inverse Fourier transform:

$$\rho_{x_1 x_2}(\tau) = F^{-1}\left[\sum_{\omega_2} \beta_{x_1 x_2 x_1}(\omega_1, \omega_2)\right] \quad (29)$$

One extension of the previous method is bicoherence-correlation based on the bicoherence, which is the normalized bispectrum:

$$b_{x_1 x_2 x_1}(\omega_1, \omega_2) = \frac{B_{x_1 x_2 x_1}(\omega_1, \omega_2)}{\sqrt{P_{x_1 x_1}(\omega_1) P_{x_2 x_2}(\omega_2) P_{x_1 x_1}(\omega_1 + \omega_2)}} \quad (30)$$

$$= \underbrace{\frac{H(\omega_1)/F(\omega_1)}{|H(\omega_1)/F(\omega_1)|}}_{media} \underbrace{\frac{\tilde{U}(\omega_1)}{SNR}}_{} \underbrace{e^{-j\omega_1 \tau_0}}_{delay}$$

where $\tilde{U}(w_1)$ can be expressed as $$\tilde{U}(\omega_1) = \sqrt{\frac{1 + \frac{1}{U_{x_1}(\omega_1)}}{1 + \frac{1}{U_{x_2}(\omega_1)}}} \quad (31)$$

The bicoherence ratio is defined to estimate the delay between the two signals $x_1(t)$ and $x_2(t)$ as an extension of the bispectrum ratio, which is denoted as $$\Lambda_{x_1 x_2 x_1}(\omega_1, \omega_2) = \frac{b_{x_1 x_2 x_1}(\omega_1, \omega_2)}{b_{x_1 x_1 x_1}(\omega_1, \omega_2)} \quad (32)$$

The bicoherence-correlation is computed as follows $$\lambda_{x_1 x_2}(\tau) = F^{-1}\left[\sum_{\omega_2} \Lambda_{x_1 x_2 x_1}(\omega_1, \omega_2)\right] \quad (33)$$

From equation (30) it will be appreciated that the correlated noise has been attenuated and the amplitude effects of the propagation paths in the media have been suppressed. Also, if the signals $x_1(t)$ and $x_2(t)$ are measured in similar noise environment, which is usually true, $U_{x1}(w_1) \approx U_{x2}(w_1)$, then $\tilde{U}(w_1) \approx 1$.

Another technique that can be used to estimate relative time-delays between waveforms is hybrid beamforming. "Beamforming" refers to the technique of appropriately shifting and summing waveforms acquired by an array to estimate the parameters in a model being fitted to the data. When the time-delays to be estimated are linearly related to sensor position, the estimation procedure is simply called "beamforming," while in the more general case, when the time delays do not have such a linear relationship, the procedure is called "generalized beamforming. Under suitable hypothesis, generalized beamforming can be justified either as a maximum likelihood estimation of the parameters (see M. J. Hinich and P. Shaman. Parameter estimation for an r-dimensional plane wave observed with additive independent gaussian errors. *Ann. Math. Ststist.*, 43(1):153-169, 1972), or as a maximum of a posterior estimation within a Bayesian framework (see S. Haykin, J. P. Reilly, V. Kezys, and E. Vertatschitsch. Some aspects of array signal processing. *IEEE processings of Radar and Signal Processing*, 139(1):1-26, 1992). When the model assumed for the data consists of delayed versions of a single unknown waveform, in the presence of added white Gaussian noise, it is a suitable procedure for estimating the waveform together with the unknown delays. The beamforming method considers that the different measurements can be modeled as delayed version of a single unknown signal, corrupted by noise:

$$x_l(t) = s(t - \Delta\tau_l(\theta)) + n_l(t), l=1, \ldots, M \quad (34)$$

where $x_l(t)$ denotes the waveform data of receiver l. The waveform delays $\Delta\tau_l(\theta)$, $l=1, \ldots, M$ depend in some fashion on the model parameters $\theta$ to be estimated. It is taken that $\Delta\tau_1(\theta)=0$, using $x_1(t)$ as the reference waveform, with the remaining M−1 delays taken relative to $x_1(t)$. A common procedure to fit a model to data of the above form is to choose the parameters $\theta$ and signal waveshape $s(t)$ that minimize the squared error between model and data:

$$(\hat{\theta}, \hat{s}(t)) = arg_{\theta, s(t)} \min \sum_{l,t} |x_l(t) - s(t - \Delta\tau_l(\theta))|^2 \quad (35)$$

When the noise $n_1(t)$ is stationary white Gaussian, this is the maximum likelihood procedure for estimating the parameters $\theta$, As Kelly and Levin showed (see E. J. Kelly and M. J. Levin. Signal parameter estimation for seismometer arrays. *U.S. ARPA Techinical Report* 339, 1964; and M. J. Levin. Least-square array processing for signals of unknown form. *The radio and Electronic Engineer*, pages 213-222, 1965), this optimization problem is equivalent to beamforming—varying the parameters $\theta$ so as to shift and align the waveforms:

$$\hat{\theta} = \arg\max_{\theta} \sum_{t} \left|\sum_{l} x(t - \Delta\tau_l(\theta))\right|^2 \quad (36)$$

By expanding the inner sum, it may be interpreted as varying the parameters $\theta$ to shift and sum the cross-correlation between all possible pairs of waveforms:

$$\hat{\theta} = \arg\max_{\theta} \sum_{l,j} r_{l,j}(\Delta\tau_l(\theta) - \Delta\tau_j(\theta)) \quad (37)$$

where $r_{ij}$ is the cross-correlation between waveforms k and j:

$$r_{ij}(\tau) = \sum_t x_i(t)\overline{x_j(t+\tau)} \quad (38)$$

Viewing generalized beamforming as shifting and summing pairwise cross-correlation is suggested in earlier work such as R. T. Hoctor and S. A. Kassam, "The unifying role of the coarray in aperture synthesis for coherent and incoherent imaging," *Proc. IEEE*, 78(4):735-752, 1990, which uses this view to unify various schemes for array aperture synthesis, while Hahn and Tretter (W. R. Hahn. Optimum signal processing for passive sonare range and bearing estimation. *Journal of Acoustic Society of America*, 58(1):201-207, 1975; and W. R. Hahn and S. A. Tretter. Optimum processing for delay-vector estimation in passive signal arrays. *IEEE Trans. Information Theory*, IT-19(5):608-614, 1973) developed an alternative delay estimation procedure based on fitting a regression model to cross-correlations described further in the next section.

One drawback of the generalized beamforming procedure described above is that it is computationally expensive, particularly if the dependence of delays $\Delta\tau_i(\theta)$ on the model parameters $\theta$ being estimated is complex and if there are relatively many parameters to estimate. Hahn and Tretter propose a scheme for bearing estimation in passive sonar. The problem is to estimate the delays of all waveforms relative to the reference waveform, and the parameters $\theta$ to estimate are precisely the delays $\Delta\tau_l$, l=1, ..., M. Rather than estimate $\Delta\tau_l$ directly, Hahn and Tretter suggest first estimating the delays between all possible pairs of waveforms by taking the maxima of the pairwise cross-correlations. The pairwise delays are simply related to the desired model parameters by an overdetermined linear system, which may be solved as the Gauss-Markov estimate of the model parameters, given the pairwise delays. The resulting two-step Hahn-Tretter procedure may be expressed as follows. Denoting $e_{ij}$ as the delay between waveforms i and j, Hahn-Tretter first estimate the pairwise delays $e_{ij}$ via cross-correlation:

$$e_{ij} = \arg\max_\tau r_{ij}(\tau) \quad (39)$$

The delay $e_{ij}$ between ith and jth waveforms is estimated by cross-correlating waveforms i and j and finding the time index for which the cross-correlation is maximized. Having estimated the pairwise delays $e_{ij}$, the next step is to estimate the desired parameters $\Delta\tau_l$. These are linearly related to the pairwise delays:

$$e_{ij} = \Delta\tau_i - \Delta\tau_j \quad (40)$$

The linear relationship between the pairwise delays $e_{ij}$ and the relative delays $\Delta\tau_i$ is made more evident by writing the pairwise delays as column vectors $e, \Delta\tau$ respectively: the two are related by matrix A with known entries:

$$e = A\Delta\tau \quad (41)$$

The convention adopted here for the ordering of the entries of e is that the index pairs i,j are ordered lexically: i<j and j is varied more rapidly than i. For example, the first entry in e,e(1) is the result of the cross-correlations between the first pairs of waveforms, i.e. waveforms 1 and 2; the second entry in e,e(2) is the result of the cross-correlations between the second pairs of waveforms i.e. waveforms 1 and 3. The pairwise delays then follow increasing ordering of waveform indices: $\Delta\tau(1)$ is the relative delays between waveforms 1 and 2, $\Delta\tau(2)$ is the relative, delays between waveforms 2 and 3, ... etc. The element of matrix A at the (ij,k) position is then $$A(ij;k) = \delta_{jk} - \delta_{ik} \quad (42)$$

Hahn and Tretter demonstrate that if signal and noise are both assumed to be stationary, Gaussian and uncorrelated, this two-step procedure is optimum in the sense that it achieves the Cramer-Rao bound, and is thus equivalent to maximum likelihood estimation, or beamforming of the full ensemble of waveforms. However, the waveform arrivals are usually not stationary in real applications of sonic logging and hydraulic fracture monitoring. Thus one can expect the true performance of such an algorithm to be somewhat short of the predicted optimum. Another disadvantage of this method is that any gross errors in the pairwise correlations will propagate into the estimates for the relative delays.

In accordance with an alternative embodiment of the invention a hybrid regression-beamforming procedure is utilized to facilitate time delay estimation. The hybrid regression-beamforming procedure includes beamforming larger size subsets (e.g. triples, quadruples, etc.), and subsequently reconciling the resulting estimates by solving an overdetermined linear system. As the size of the subset being beamformed increases, more waveform averaging is performed, and the resulting estimates are less sensitive to gross errors, although it is recognized that computation complexity also increases. If the number of waveforms is M and the size of the subsets being beamformed is P, then there are (M P) subsets to be beamformed, i.e. the number of subsets of size P that can be chosen from the of indices 1, ... M, then these subsets can be ordered by lexically ordering the indices. Beamforming each triple of waveforms yields estimates of the P−1 relative delays between the P waveforms. These relative delay estimates can be arranged in an (M P)*(P−1) matrix, e. The estimates obtained by beamforming subsets of size P are linearly related to the M−1 relative delays $\Delta\tau$ that are thought by matrix A with known entries as before.

As mentioned above, hybrid regression-beamforming can be carried out for subsets of larger size. Thus, a hierarchy of algorithms is possible, trading off robustness against computational complexity. One systematic way to move through the hierarchy is to start with the simplest procedure, i.e., the Hahn-Tretter regression on pairwise crosscorrelations, and evaluate the model error. A statistical significance test can be performed on the model error to evaluate whether the derived estimates fit the hypothesized model with high probability, as described in H. Scheffé, "*The Analysis of variance*," John Wiley and Sons, 1959. If least-squares is the criterion, then a $\chi^2$ test is appropriate, and if semblance is optimized then a non-central $\beta$ test is appropriate (see E. Douze and S. Laster, "Statistics of semblance," *Geophysics*, 44:1999-2003, 1979). If the model error is too high, then subsets of size 3 can be beamformed. Subsets of increasing size maybe used to derive estimates, until the model error is acceptably low.

In accordance with another alternative embodiment of the invention the hybrid regression-beamforming procedure is combined with high order statistics to facilitate time delay estimation. In practice, it means that rather than using the correlation to obtain the delay estimate between pairs (see equation 38), the delay estimated will be computed using high order statistics as already explained above. Since the high order statistics is demonstrated to be more effective at estimating the corresponding delays between pairs of waveforms as shown previously, combing both approached will provide more robust results. Further, this combination of methods will not significantly increase computational requirements.

A statistical procedure may also be employed to detect the absolute time of arrival of a waveform. Absolute time detection helps to enhance fracture localization. Perhaps the most common technique for computing first arrival of an event is the Energy Ratio Approach, which is based on the ratio between the instantaneous trace energy normalized by the cumulative trace energy. This is computed as follows:

$$Ef(t) = \frac{\int_{\tau}^{\tau+T} x^2(t)\,dt}{\int_0^T x^2(t)\,dt} \qquad (43)$$

where T is the width of the running window used to compute the instantaneous energy. Nevertheless, the normalization by the cumulative energy will penalize the late arrival. To avoid this kind of problem another factor can be added to the denominator:

$$Ef(t) = \frac{\int_{\tau}^{\tau+T} x^2(t)\,dt}{\int_0^\tau x^2(t)\,dt + \alpha \int_0^L x^2(t)\,dt} \qquad (44)$$

where L is the length of the trace considered. The coefficient $\alpha$ is in the range of $[0,1]$. Such a detector for first motion is satisfactory under certain conditions, but not in the presence of high noise levels. Similar to the energy function indicator, another commonly used first motion detector, which just computes the energy before and after the point of interest inside a window of width T, is denoted as follows:

$$Er(t) = \frac{\int_{\tau}^{\tau+T} x^2(t)\,dt}{\int_{\tau-T}^{T} x^2(t)\,dt} \qquad (45)$$

Similar to the energy function, a normalization factor can be introduced for the energy ratio indicator, to obtain the following indicator:

$$Er(t) = \frac{\int_{\tau}^{\tau+T} x^2(t)\,dt}{\int_{\tau-T}^{T} x^2(t)\,dt + \alpha \int_0^L x^2(t)\,dt} \qquad (46)$$

An extension of this method can be obtained by using the product of the energy ratio and energy function indicators. However, these methods are also degraded in the presence of relatively high noise levels.

In accordance with one embodiment of the invention a statistical detection technique is used to estimate first arrival time in the presence of high noise. The goal is to detect a point before which the signal is considered as noise and after which the signal is considered the signal of interest in order to, for example, detect the first arrival of the various events present in HFM data in order to properly estimate the absolute delay estimate across the array. A procedure is been described in H. P. Valero, M. Tejada, S. Yoneshima, and H. Yamamoto, "High resolution compressional slowness log estimation using first motion detection," SEG Extended Abstract, 75 th Annual Meeting, Houston, Nov. 6-11, 2005, to detect first motion of a single trace using statistical signal processing. However, the HFM data is more complicated due to corruption by various type of noise and in addition. It would also be advantageous to use the same algorithm to detect P and or S arrival. It is reasonable to assume that the spectral characteristics before and after the first break are different. From the point of view of time series modeling, this means that the models for time series before and after the arrival of a compressional, for example, are quite different. Since the spectrum of the time series can be well expressed by an appropriate AR model, it is reasonable to use an AR model for each time series, i.e. for the time series before and after the first break. In this case it is assumed that these two series can be considered as locally stationary AR models. Note that this methodology does not make any assumption about the type of component or signal for which the first arrival is to be detected. The methodology is not limited to the detection of a compressional component and can be applied to other detection problems.

The principle of the statistical method is that before the first break, T, of an event, u, the time series is considered as noise, whereas after the first break the signal of interest is considered as being present. The problem of detecting the first break can therefore seen as detecting a change in the AR model. Defining $x_{ml}(t)$; $m=1, \ldots, N_r$; $l=\{x, y, z\}$; $t=1, \ldots, N$, a windowed time series containing a signal of interest, the noise model can be written as $$x_l = \sum_{i=1}^{p_1} A_{i1} x_{l-1} + \varepsilon_{l1}; \quad l = 1, \ldots, T \qquad (47)$$

and the signal model as $$x_l = \sum_{i=1}^{p_2} A_{i2} x_{l-1} + \varepsilon_{l2}; \quad l = 1, \ldots, N \qquad (48)$$

where $p_j$ is the model order of the autoregressive model, $A_{ji}$ is the autogregressive coefficient matrix of the AR model of dimension k×k, where k is equal to the number of components, i.e., 3 in general or 2 if one of the component cannot be used. $\epsilon_{ij}$=noise(C) are uncorrelated random vectors with mean zero and covariance $C_j$; j=1, 2. Assuming the arrival time and the orders of the autoregressive models, $p_1$ and $p_2$ are know, the distribution of the time series can be written as follows:

$$x_{l,j} \sim N\left(\sum_{i=1}^{p_j} A_{ij} x_{l-1}, C_j\right) \qquad (49)$$

where j=1 if l=1, . . . , T and j=2 if l=T+1, . . . , N. The log likelihood of this problem can be written as $$LL(A_1, A_2, C_1, C_2) = \qquad (50)$$
$$\frac{-1}{2}\{(N-p_1)\log 2\pi + (T-p_1)\log|C_1| + \} \sum_{l=1+p_1}^{T} \varepsilon_{l1}^{\dagger} C_1^{-1} \varepsilon_{l1} +$$
$$(N-T)\log|C_2| + \sum_{l=1+T}^{N} \varepsilon_{l2}^{\dagger} C_2^{-1} \varepsilon_{l2}.$$

The maximum likelihood of $A_{i,j}$ and $C_j$ (i=1, ... N) are given by maximizing the previous equation. It also possible to calculate the parameters for the signal and noise model by minimizing the following equations:

$$(\hat{A}_1, \hat{C}_1) = arg_{A_1, C_1} \min \left[ (N-T) \log|C_1| + \sum_{l=1+T}^{N} \varepsilon_{l2}^{\dagger} C_1^{-1} \varepsilon_{l2} \right]$$

for the noise model while for the signal model $$(\hat{A}_2, \hat{C}_2) = arg_{A_2, C_2} \min \left[ (N-T) \log|C_2| + \sum_{l=1+T}^{N} \varepsilon_{l2}^{\dagger} C_2^{-1} \varepsilon_{l2} \right].$$

Knowing these parameters, it is possible to compute the Bayesian Information Criterion (BIC) as:

$$BIC = -2LL(\hat{A}_1, \hat{C}_1, \hat{A}_2, \hat{C}_2) + k \log'[N].$$

The first break is then estimated at the minimum of the BIC function.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method comprising:
acquiring from a plurality of sensors time series data corrupted by noise and including signals caused by microseismic events in a subterranean formation;
processing discrete portions of the data using statistical analysis to determine, for each portion, whether an event of interest is present, wherein the statistical analysis includes, for each portion, calculating a criterion using both a signal component and noise information from the data and performing a hypothesis test to detect whether an event is present in the portion;
for each portion containing an event of interest, determining a first arrival time of the event and delay across the plurality of sensors;
using the first arrival time and delay across the plurality of sensors to spatially map fractures in the subterranean formation; and
controlling a fracture treatment of the subterranean formation using the spatially mapped fractures.

2. The method of claim 1 further including, prior to determining whether an event of interest is present, filtering the data to remove at least some noise to produce filtered data together with residual noise which is used to determine a noise power spectrum.

3. The method of claim 1 wherein each portion is within a window sliding on a time axis and the hypotheses test is performed for each time location of the window to detect whether an event is present in the window.

4. The method of claim 1 further including calculating an indication of a level of confidence in the presence of an event for each window location.

5. The method of claim 1 wherein determining whether an event is present includes estimating a transfer function and estimating a noise power spectrum.

6. The method of claim 5 including estimating the noise power spectrum by using a multiple-taper method.

7. The method of claim 1 wherein acquiring from a plurality of sensors time series data includes receiving from one or more arrays of multicomponent geophones information associated with microseismic waves.

8. The method of claim 1 wherein determining the first arrival time of the event includes estimating relative delay across the plurality of sensors.

9. The method of claim 8 including beamforming subsets greater than or equal to pairs, and reconciling resulting estimates by solving an overdetermined linear system.

10. The method of claim 9 further including performing high order statistics to facilitate estimating relative delay across the plurality of sensors.

11. The method of claim 10 including performing bispectral-correlation.

12. The method of claim 1 further including employing a statistical procedure to determine absolute time of arrival of a waveform.

13. A non-transitory computer program product comprising a computer usable medium having a computer readable program code embodied therein, said computer readable program code adapted to be executed to implement a method for event classification, said method comprising:
acquiring from a plurality of sensors time series data corrupted by noise and including signals caused by microseismic events in a subterranean formation;
processing discrete portions of the data using statistical analysis to determine, for each portion, whether an event of interest is present, wherein the statistical analysis includes, for each portion, calculating a criterion using both a signal component and noise information from the data and performing a hypothesis test to detect whether an event is present in the portion;
for each portion containing an event of interest, determining a first arrival time of the event and delay across the plurality of sensors;
using the first arrival time and delay across the plurality of sensors to spatially map fractures in the subterranean formation; and
controlling a fracture treatment of the subterranean formation using the spatially mapped fractures.

14. The computer program product of claim 13 further including, prior to determining whether an event of interest is present, filtering the data to remove at least some noise to produce filtered data together with residual noise which is used to determine a noise power spectrum.

15. The computer program product of claim 13 wherein each portion is within a window sliding on a time axis and the hypotheses test is performed for each time location of the window to detect whether an event is present in the window.

16. The computer program product of claim 13 further including calculating an indication of a level of confidence in the presence of an event for each window location.

17. The computer program product of claim 13 wherein determining whether an event is present includes estimating a transfer function and estimating a noise power spectrum.

18. The computer program product of claim 17 including estimating the noise power spectrum by using a multiple-taper method.

19. The computer program product of claim 13 wherein acquiring from a plurality of sensors time series data includes receiving from one or more arrays of multicomponent geophones information associated with microseismic waves.

20. The computer program product of claim 13 wherein determining the first arrival time of the event includes estimating relative delay across the plurality of sensors.

21. The computer program product of claim 20 including beamforming subsets greater than or equal to pairs, and reconciling resulting estimates by solving an overdetermined linear system.

22. The computer program product of claim 21 further including performing high order statistics to facilitate estimating relative delay across the plurality of sensors.

23. The computer program product of claim 22 including performing bispectral-correlation.

24. The computer program product of claim 13 further including employing a statistical procedure to determine absolute time of arrival of a waveform.

25. Apparatus comprising:
a plurality of sensors that acquire time series data that is corrupted by noise and that includes signals caused by microseismic events in a subterranean formation;
processing circuitry configured to:
process discrete portions of the data using statistical analysis to determine, for each portion, whether an event of interest is present, wherein the statistical analysis includes, for each portion, performing a hypothesis test to detect whether an event is present in the portion and calculating a criterion using both a signal component and noise information from the data; and
for each portion containing an event of interest, determine a first arrival time of the event and delay across the plurality of sensors from which the time series data was collected; and
an interface which outputs information associated with spatially mapping fractures in the subterranean formation based on the first arrival time and delay across the plurality of sensors.

26. The apparatus of claim 25 wherein the processing circuitry is configured to, prior to determining whether an event of interest is present, filters the data to remove at least some noise to produce filtered data together with residual noise which is used to determine a noise power spectrum.

27. The apparatus of claim 25 wherein each portion is within a window sliding on a time axis and the hypotheses test is performed for each time location of the window to detect whether an event is present in the window.

28. The apparatus of claim 25 wherein the processing circuitry is configured to calculate an indication of a level of confidence in the presence of an event for each window location.

29. The apparatus of claim 25 wherein determining whether an event is present includes estimating a transfer function and estimating a noise power spectrum.

30. The apparatus of claim 29 wherein the processing circuitry is configured to estimate the noise power spectrum by using a multiple-taper method.

31. The apparatus of claim 25 further comprising a hydrophone digitizer, recorder, and analyzer device.

32. The apparatus of claim 25 wherein the processing circuitry is configured to determine the first arrival time of the event by estimating relative delay across the plurality of sensors.

33. The apparatus of claim 32 is configured to beamform subsets greater than or equal to pairs, and reconciling resulting estimates by solving an overdetermined linear system.

34. The apparatus of claim 33 is configured to perform high order statistics to facilitate estimating relative delay across the plurality of sensors.

35. The apparatus of claim 34 is configured to perform bispectral-correlation.

36. The apparatus of claim 25 wherein the processing circuitry is configured to employ a statistical procedure to determine absolute time of arrival of a waveform.

\* \* \* \* \*